United States Patent
Takano et al.

(10) Patent No.: US 6,742,765 B2
(45) Date of Patent: Jun. 1, 2004

(54) OPERATING DEVICE AND VALVE SYSTEM

(75) Inventors: Tomohiro Takano, Tokyo (JP); Takumi Miyazaki, Tokyo (JP)

(73) Assignee: Yamatake Corporation, Tokyo (JP)

( * ) Notice: Subject to any disclaimer, the term of this patent is extended or adjusted under 35 U.S.C. 154(b) by 249 days.

(21) Appl. No.: 10/037,393

(22) Filed: Jan. 3, 2002

(65) Prior Publication Data

US 2002/0088962 A1 Jul. 11, 2002

(30) Foreign Application Priority Data

Jan. 10, 2001 (JP) .......................... 2001-002875

(51) Int. Cl.[7] .............................................. F16K 31/44
(52) U.S. Cl. ....................................................... 251/292
(58) Field of Search ................... 251/291, 292, 251/68, 69, 70, 71; 137/556, 556.3

(56) References Cited

U.S. PATENT DOCUMENTS

| 3,430,916 A | * | 3/1969 | Raymond, Jr. ............... 251/71 |
| 4,313,595 A | * | 2/1982 | Markley et al. ........ 251/292 X |
| 4,633,897 A | * | 1/1987 | Effenberger ............ 251/292 X |
| 4,705,063 A | * | 11/1987 | Robinson ................ 137/315.03 |
| 4,780,785 A | | 10/1988 | Schabert et al. |
| 4,817,658 A | | 4/1989 | Lyons |
| 4,997,069 A | * | 3/1991 | Strache ..................... 251/71 X |
| 5,634,486 A | * | 6/1997 | Hatting et al. .......... 251/292 X |
| 6,119,456 A | * | 9/2000 | Louis et al. .................. 60/444 |

FOREIGN PATENT DOCUMENTS

FR          1326842 A     5/1963

OTHER PUBLICATIONS

Patent Abstracts of Japan, vol. 1998, No. 14, Dec. 31, 1998 and JP 10–252923 A (Keihin Corp.), Sep. 22, 1998 —Abstract only.

* cited by examiner

*Primary Examiner*—Michael Mar
*Assistant Examiner*—Eric Keasel
(74) *Attorney, Agent, or Firm*—Frishauf, Holtz, Goodman & Chick, P.C.

(57) ABSTRACT

A spring return type valve system includes: a valve (2) having a valve shaft (22) to be operated rotationally for controlling the flow rate of fluid flowing through a fluid channel; an actuator (4) having an output shaft (42) rotated by an electric motor; a spring unit (3) having a rotating shaft (32) for transmitting the rotational power of the actuator output shaft to the valve shaft and a return spring for giving the rotating shaft a rotational power in one direction; and a yoke (5) for the actuator and the spring unit to be detachably mounted on.

10 Claims, 7 Drawing Sheets

OPERATING DEVICE AND VALVE SYSTEM

BACKGROUND OF THE INVENTION

1. Field of the Invention

The present invention relates to an operating device having an output shaft for rotating an object to be operated, and a valve system having such an operating device and a valve serving as the object to be operated. In particular, the present invention relates to a spring return type operating device having a return spring for rotating an object to be operated in a return direction, and a spring return type valve system having this kind of operating device and a valve.

2. Description of the Related Art

For flow control of fluid that flows through a fluid channel, such as water, steam, gas, air, and oil, valve systems of spring return type and the like are used. As exemplarily illustrated in FIG. 11, a conventional spring return type valve system includes a valve 70 inserted in a fluid channel (not shown), a return spring unit 80 mounted on the valve 70, and an electric actuator 90 mounted on the return spring unit 80.

The return spring unit 80 has a housing 81, a rotating shaft 82, and a return spring 87 interposed therebetween. The return spring unit 80 is configured so that the spring force from the return spring 87 rotates the rotating shaft 82 and a valve shaft 72 of the valve 70 coupled thereto in one direction, e.g., in the direction that closes the valve. The electric actuator 90 rotates its output shaft 92 with a motor 96 via a reduction mechanism 97 consisting of a gear train so that the valve shaft 72 coupled to the actuator output shaft 92 is rotated against the spring force of the return spring 87 through the medium of the rotating shaft 82 of the return spring unit 80.

Thus, in the spring return type valve system, the valve shaft 72 and a valve element 75 integral therewith are rotated by the electric actuator 90 to a predetermined rotational position so as to adjust the opening of the valve 70, whereby the flow rate of the fluid flowing through the fluid channel is controlled. When the energization to the actuator 90 is interrupted, the valve shaft 72 is rotated in the closing direction by the spring force of the return spring 87 to close the valve 70.

In the conventional spring return type valve system described above, the housing 81 of the return spring unit 80 includes an outer housing and an inner housing. The outer housing has a lower flange 84 thereof fixed to a flange 74 of the housing 71 of the valve 70 with bolts 100. The inner housing is fitted to a socket part 73 of the housing 71 and supports the rotating shaft 82 of the return spring unit 80. A recess 83 formed in the inner housing accommodates a joint 110 for coupling the rotating shaft 82 to the valve shaft 72. Meanwhile, the housing 91 of the electric actuator 90 includes an upper housing and a lower housing. The upper housing accommodates the reduction mechanism 97. The lower housing fits a socket part 85 of an upper flange 86 of the return spring unit 80, and has a flange 95 which is fixed to the upper flange 86 with bolts 101. The lower housing has a recess 93 which accommodates a joint 111 for coupling the actuator output shaft 92 to the rotating shaft 82 of the return spring unit 80.

As described above, in the conventional spring return type valve system, the top end portion of the valve shaft 72, the joint 110, and the bottom end portion of the rotating shaft 82 are accommodated in the recess 83 of the housing 81. The top end portion of the rotating shaft 82, the joint 111, and the bottom end portion of the output shaft 92 are accommodated in the recess 93 of the housing 91. These shafts and joints are therefore invisible from exterior, sometimes working against the assembling and disassembling operations of the valve system.

Take, for example, the case of coupling the valve shaft 72 to the joint 110. When the valve shaft 72 is fitted into the joint 110, a flat-faced part 72a formed on the valve shaft 72 must be aligned to a flat part of a fit hole formed in the joint 110. The same holds true when one end portion of the rotating shaft 82 is fitted into the joint 110, and when the other end portion of the rotating shaft 82 and the output shaft 92 are fitted into the joint 111. In FIG. 11, the reference numerals 82a, 82b, and 92a show the flat-faced parts. In the conventional system, the accommodation of the joints 110 and 111 in the recesses 83 and 93 of the housings 81 and 91 makes the directions of the flat-faced parts invisible from exterior, deteriorating the workability in coupling the corresponding ones of the valve shaft 72, the rotating shaft 82, and the output shaft 92 with the joints 110 and 111.

When such coupling operations are performed under a work environment where neither the socket part 73 between the housings 71 and 82 nor the socket part 85 between the housings 81 and 92 can be visually observed from exterior, the peripheral portions of these socket parts and the openings of the housings can possibly be damaged or deformed. In addition, foreign matter adhering to the socket parts and rust forming on the socket parts are easy to be passed undetected, so that an assembly failure can occur due to the foreign matter and rust.

In cases where the electric actuator 90 suffers a breakdown that the output shaft 92 becomes unrotatable due to such reasons as a gear breakage in the reduction mechanism 97, the electric actuator 90 is detached from the valve system for repair. On this occasion, if under a work environment where the rotational position of the valve shaft 72 cannot be observed visually from exterior, the operator can possibly remove the bolt 101 despite incomplete closure of the valve 70. In this case, the entire electric actuator 90 might rotate abruptly due to the spring force from the return spring 87. With valves of larger sizes in particular, the return spring 87 has a great spring force and it is sometimes impossible for the operator to quickly hold the electric actuator 90 from rotating with strong force. Moreover, when the electric actuator 90 is detached with the valve 70 open, the load on the return spring 87 decreases rapidly. The result is that the spring force from the return spring 87 rotates the valve shaft 72 sharply in the closing direction. Such sharp closure of the valve 70 can cause a water hammer, possibly breaking the valve 70.

In assembling/disassembling the valve system of the type shown in FIG. 11, the electric actuator 90 is detached before the lower flange 84 of the return spring unit 80 is attached to or detached from the flange 71 of the valve 70 by using a screwdriver or other tools. If the valve system is configured such that the upper flange 86 of the return spring unit 80 has a diameter considerably greater than that of the lower flange 84, or that the two flanges have a considerably small gap therebetween, the tools to loosen and tighten the bolt 100 interferes with the upper flange 86, finding the operation difficult. Using an L-tipped tool to operate laterally from the housing 81 deteriorates workability.

Moreover, in the conventional valve system shown in FIG. 11, the housing 81 of the return spring unit 80 and the housing 71 of the valve 70 are in direct contact with each other. When the object to be controlled by the valve system is hot fluid such as steam, the valve 70 becomes high in temperature. Therefore, the housing 81 also becomes high in temperature because of the heat conducting from the valve 70, which makes it difficult to detach the return spring unit 80. In addition, the heat conducting from the valve 70 thermally degrades the return spring unit 80 and the actuator 90. On the other hand, when the valve 70 is cold due to coolant fluid, the return spring unit 80 and the actuator 90 decrease in temperature with internal condensation, becoming prone to rust and short-circuit breakage.

SUMMARY OF THE INVENTION

It is an object of the present invention to provide an operating device which is capable of quick, safe attachment to and detachment from an object to be operated and can reduce the effect of heat conducting from the object to be operated.

Another object of the present invention is to provide a valve system comprising an operating device of this type and a valve serving as the object to be operated, the valve system being capable of quick, safe assembling and disassembling operations.

According to one aspect of the present invention, a spring return type operating device comprises: a yoke adapted to be mounted on an object to be operated having a rotating shaft; an actuator having a drive unit and an output shaft rotated by the drive unit, the actuator being detachably mounted on the yoke; and a spring unit detachably mounted on the yoke so as to lie between the actuator and the object to be operated. The spring unit has a rotating shaft and a return spring for producing a spring force for rotating the rotating shaft in one direction. The rotating shaft has a first end portion adapted to be coupled to the rotating shaft of the object to be operated and a second end portion coupled to the output shaft of the actuator. The yoke defines a space for accommodating at least part of the actuator and at least part of the spring unit. The space has an open face for making the coupling portions of the first and second end portions of the rotating shaft of the spring unit with the rotating shaft of the object to be operated and the output shaft of the actuator, respectively, visible from exterior.

According to the spring return type operating device of the present invention, at the occasion of mounting the spring unit and the actuator onto the yoke that is mounted on the object to be operated, it is possible to couple the first and second end portions of the rotating shaft of the spring unit to the rotating shaft of the object to be operated and the output shaft of the actuator while seeing their respective coupling portions from exterior through the open face of the space which the yoke defines. This gives the operating device excellent assembleability to the object to be operated. In addition, the effect that the heat from the object to be operated has on the spring unit and the actuator is reduced by the yoke which lies between the object to the operated and the spring unit/the actuator. More specifically, when the object to be operated is hot, the heat from the object to be operated is radiated to the ambient air through the yoke before conducting to the spring unit and the actuator. When the object to be operated is cold, the yoke exercises the function of absorbing heat from the ambient air to relieve the cooling action due to the heat from the object to be operated. In this way, the effect of the heat conducting from the object to be operated is relieved. As a result, the spring unit and the actuator improve in durability, and condensation is prevented.

In the spring return type operating device of the present invention, the drive unit of the actuator is preferably composed of an electric motor.

According to this preferred aspect, the rotational position of the output shaft of the actuator and hence the rotational position of the rotating shaft of the object to be operated can be adjusted easily and precisely by the electric motor.

The yoke preferably has a bottom wall and side walls that are extended from both ends of the bottom wall and are opposed to each other. The bottom wall of the yoke is provided with a first fitting part to which the object to be operated is attached. Second fitting parts for the spring unit to be mounted on are arranged at intermediate portions of the side walls. Third fitting parts for the actuator to be mounted on are arranged on distal end portions of the side walls.

According to this preferred aspect, the yoke is formed in a general U shape as viewed from the front. This yoke is extremely simple in configuration and capable of fabrication at low cost. The side walls of the yoke define therebetween a wide open face such as facilitates the coupling operations described above.

The second fitting parts are preferably arranged in such positions that the spring unit mounted on these second fitting parts and the first fitting part come close to each other at their opposed surfaces. The third fitting parts are preferably arranged in such positions that the actuator mounted on these third fitting parts and the spring unit mounted on the second fitting parts come close to each other at their opposed surfaces.

According to this preferred aspect, the yoke cannot be mounted on the object to be operated at its first fitting part as long as the spring unit is on the second fitting parts of the yoke. The spring unit cannot be mounted on the second fitting parts as long as the actuator is on the third fitting parts. In other words, the yoke is mounted on the object to be operated before the spring unit and the actuator are mounted on the yoke in this order. On the other hand, the actuator and the spring unit are detached from the yoke in this order before the yoke is detached from the object to be operated. In this way, the order of attachment and the order of detachment determine by themselves for safety operations. In addition, all the attaching and detaching operations can be performed from above with excellent workability. Furthermore, with the spring unit and the actuator detached from the yoke, the rotational position of the rotating shaft of the object to be operated can be visually observed from exterior for proper operations.

The first fitting part of the yoke preferably has a shaft hole and a plurality of bolt through holes. The shaft hole is formed through the bottom wall of the yoke, and the rotating shaft of the object to be operated is inserted therethrough. The bolt through holes are formed in the bottom wall concentrically about the shaft hole at regular intervals in angle. The object to be operated is provided with a plurality of bolt holes consistent with the plurality of bolt through holes.

According to this preferred aspect, the yoke is bolted to the object to be operated with the rotating shaft of the object to be operated inserted through the shaft hole in the first fitting part of the yoke. Here, the flexibility in the mounting orientation of the yoke with respect to the object to be operated determines according to the angular intervals of the bolt through holes. Therefore, the spring return type operating device can be mounted on the object to be operated in desired orientation. The bolt through holes may be circular in section. Bolt through holes of arced sections, however, allow further adjustments in the mounting location of the yoke, increasing the forming tolerances of the bolt through holes and the bolt holes.

It is preferred that the bolt through holes be long holes extending in radial directions of the shaft hole.

According to this preferred aspect, the yoke of the operating device can be mounted on various types of objects to be operated having bolt holes at different radial positions. This enhances the operating device in versatility.

The second and third fitting parts are preferably formed by cutting and erecting inward the corresponding portions of the side walls of the yoke.

According to this preferred aspect, there is no need for the second and third fitting parts to be separately formed on the yoke side walls. Thus, the fitting parts can be provided at low cost.

The second and third fitting parts are preferably arranged apart from each other as seen from above.

According to this preferred aspect, the second and the third fitting parts of the yoke can be accessed from above with improved workability.

The rotating shaft of the object to be operated or the output shaft of the actuator is preferably provided with indicating means for allowing the visual observation of a predetermined rotational position thereof (for example, a full close position or full open position), such as a pointer or a marking.

According to this preferred aspect, the rotating shaft of the object to be operated and the actuator output shaft can be easily observed visually for rotational position. This ensures safety operations.

According to another aspect of the present invention, a spring return type valve system comprises: a valve having a valve shaft arranged rotatably and a valve element integral with the valve shaft; a yoke mounted on the valve; an actuator having a drive unit and an output shaft rotated by the drive unit, the actuator being detachably mounted on the yoke; and a spring unit having a rotating shaft and a spring for producing a spring force for rotating the rotating shaft in one direction, the spring unit being detachably mounted on the yoke so as to lie between the actuator and the valve, the rotating shaft being coupled at both end portions to the output shaft and the valve shaft, respectively. The yoke defines a space for accommodating at least part of the actuator and at least part of the spring unit. The space has an open face for making the coupling portions of the end portions of the rotating shaft of the spring unit with the valve shaft and the output shaft of the actuator visible from exterior.

According to the spring return type valve system of the present invention, it is possible to couple the end portions of the rotating shaft of the spring unit to the valve shaft and the actuator output shaft easily while visually observing their respective coupling portions. In addition, the effect of heat conducting from the valve is reduced by the yoke.

Like the various aspects of the spring return type operating device described above, the spring return type valve system of the present invention may be configured in various forms for various effects.

DETAILED DESCRIPTION

Hereinafter, a spring return type valve system according to a first embodiment of the present invention will be described with reference to FIGS. 1–9.

Figure 1:
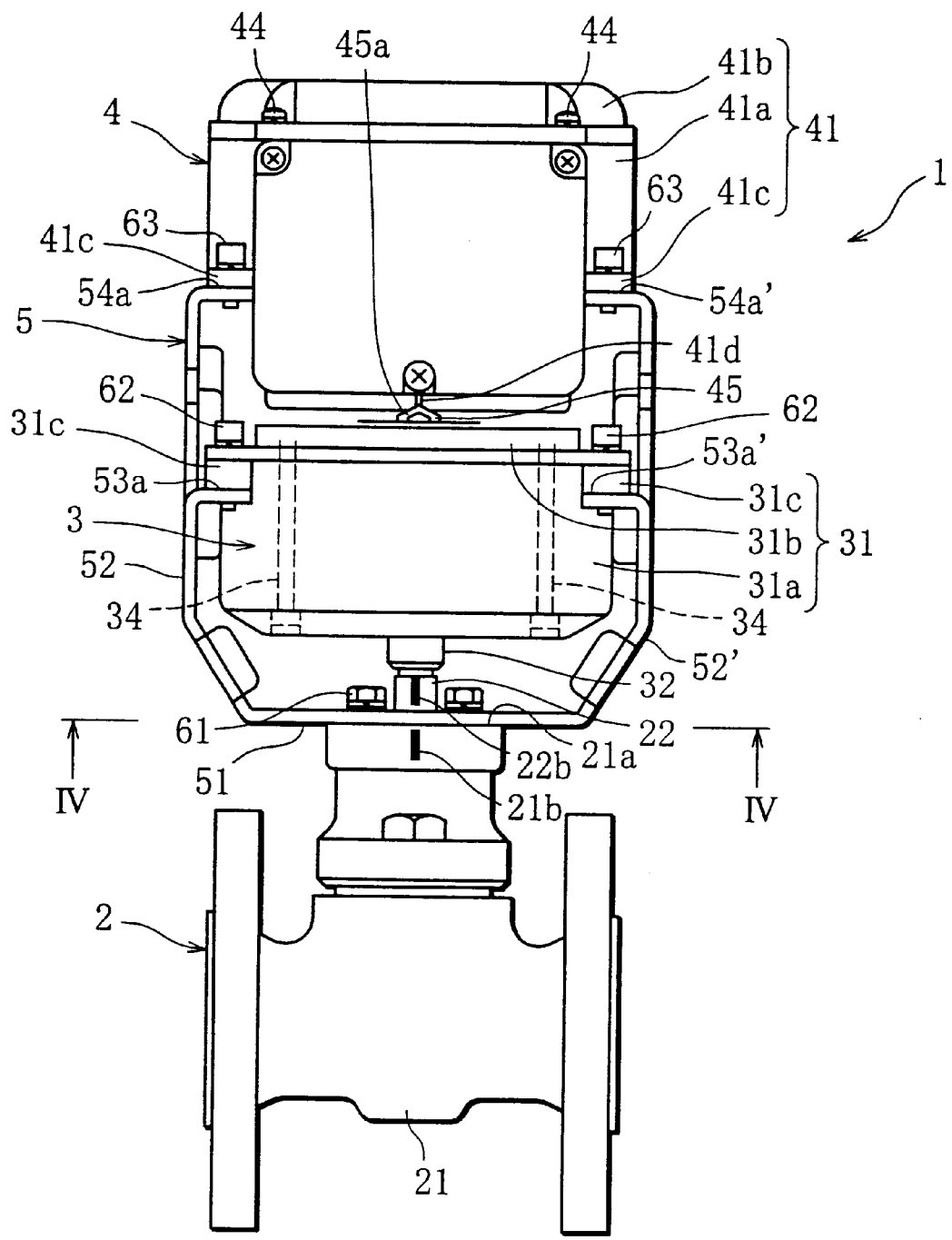
FIG. 1 is a front view of a spring return type valve system according to a first embodiment of the present invention.

As shown in FIG. 1, a spring return type valve system 1 comprises a valve 2, a spring unit 3, an actuator 4, and a yoke 5. The valve 2 is inserted in the middle of a fluid channel, not shown, to control the flow rate of fluid that flows the fluid channel. The spring unit 3 subjects the valve 2 to a spring force for rotating the valve 2 in one direction, e.g., a closing direction. The actuator 4 can rotate the valve 4 both in the opening and closing directions. The yoke 5 is detachably attached to the valve 2. The spring unit 3 and the actuator 4 are attached to the yoke 5 in this order.

Figure 11:
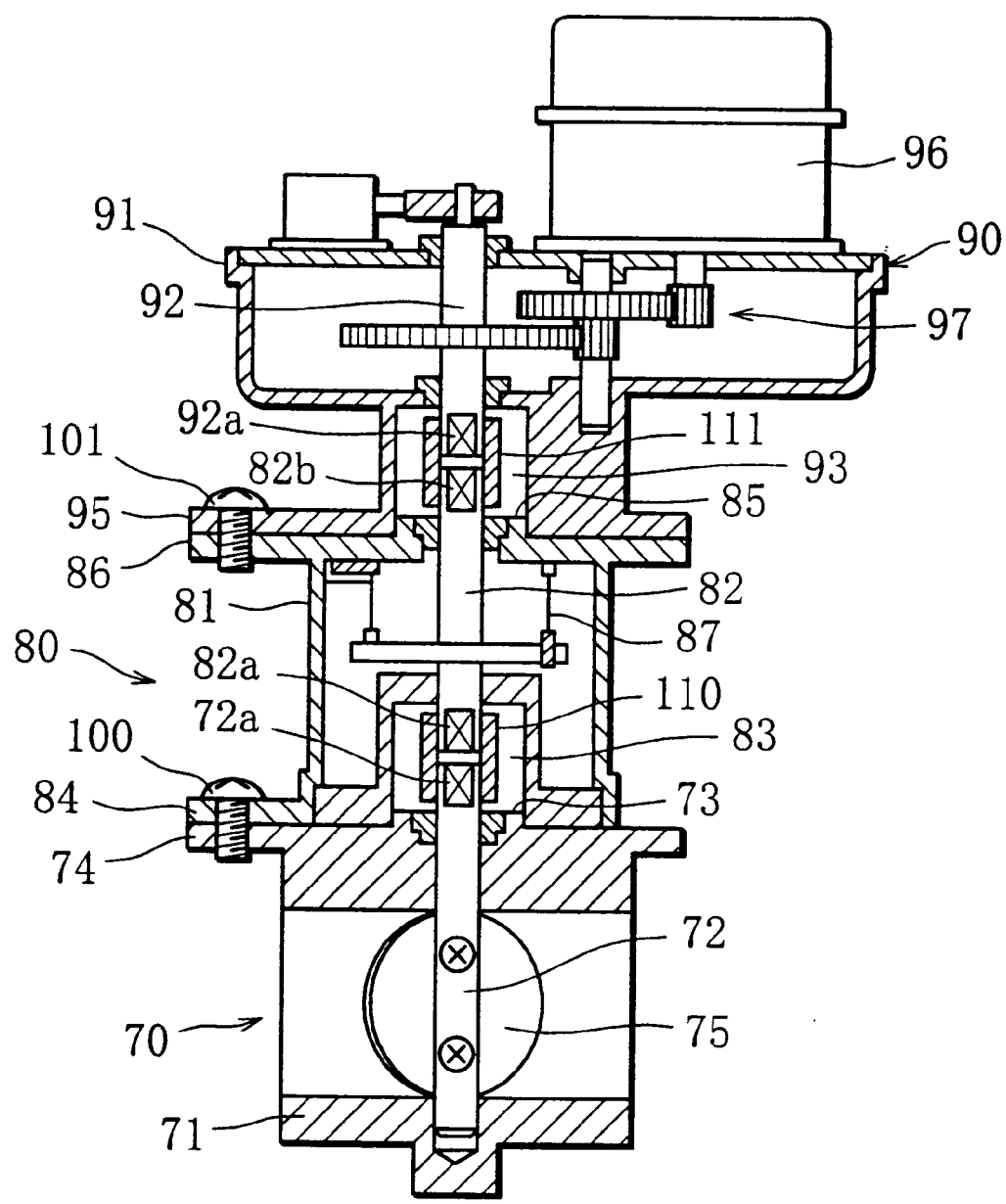
FIG. 11 is a sectional view of a conventional spring return type valve system.

The valve 2 has a housing 21 and a valve shaft 22 which is rotatably supported by the housing 21. A rotary valve element (not shown) fixed to the valve shaft 22 is accommodated in the housing 21 along with the valve shaft 22. The rotary valve element is one corresponding to the valve element 75 shown in FIG. 11, and is selected from among valve elements of ball type, butterfly type, eccentric type, and the like depending on the intended use. The valve shaft 22 is coupled to the actuator 4 via the spring unit 3. The rotational operation of the valve shaft 22 by the actuator 4 rotates the valve element to change the valve opening, thereby controlling the flow rate of the fluid.

As stated previously, the yoke 5 is attached to the valve 2, and the valve shaft 22 is coupled to the spring unit 3. In this connection, a top surface 21a of the housing 21 of the valve 2 constitutes a mounting surface for the yoke 5 to be attached to. This housing top surface 21a has a shaft hole which the valve shaft 2 is passed through. In addition, a plurality of, e.g., four bolt holes (not shown) to be used for attaching the yoke 5 to the valve 2 are formed concentrically about the shaft hole at regular intervals in angle. The extremity or distal end portion of the valve shaft 22 is protruded from the housing top surface 21a. This extremity is chambered on the periphery so as to make a flat-faced part 22a of square section to be used for coupling with the spring unit 3.

For the sake of the safety in its assembling and disassembling operations, the spring return type valve system 1 has first valve opening indicating means for indicating a predetermined valve opening position, e.g., the closed position. As shown in FIG. 1, the first valve opening indicating means is composed of a marking 22b and a mark 21b. The marking 22b is arranged on the periphery of the extremity of the valve shaft 22. The mark 21b is a projection or the like for indicating the closed position, arranged on the top periphery of the housing 21. The marking 22b indicates the current rotational position of the valve element which makes integral rotation with the valve shaft 22. This marking 22b coincides with the mark 21b when the valve element is in the closed position. Such valve opening indication is especially convenient for ball type valve elements which allow valve shaft rotations of 360° or more. Incidentally, the mark 21b may be arranged for a plurality of predetermined valve opening positions.

Next, description will be given of the spring unit 3 which lies between the valve 2 and the actuator 4.

Figure 5:
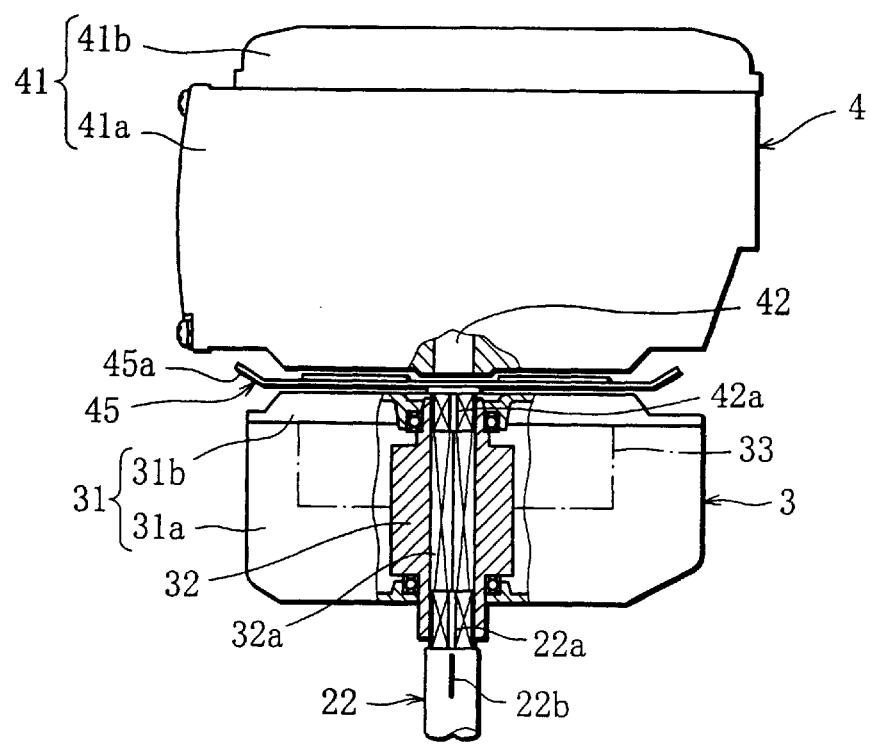
FIG. 5 is a partial side view of the spring unit and the actuator shown in FIG. 1 with both end portions of a rotating shaft of the spring unit, a valve shaft, and an output shaft of the actuator in section.

As shown in FIGS. 1 and 5, the spring unit 3 has a housing 31 and a rotating shaft 32 rotatably supported by the housing 31. The housing 31 has a body 31a and a lid 31b fixed on the top. The rotating shaft 32 is protruded at both end portions from the top and bottom of the housing body 31a, respectively. The rotating shaft 32 has a square hole 32a formed through its shaft center. This square hole 32a is fitted to the flat-faced part 22a of the valve shaft 22 and a flat-faced part 42a of an output shaft 42 of the actuator 4.

The housing body 31a contains a return spring 33 of, for example, spiral type. This return spring 33 corresponds to the return spring 87 shown in FIG. 11. FIG. 5 outlines the return spring 33 in dashed lines. The return spring 33 is fixed at both end portions to an inner surface of the housing body 31a and the rotating shaft 32, respectively, so as to produce a return force for rotating the rotating shaft 32 in one direction, e.g., the closing direction.

Figure 9:
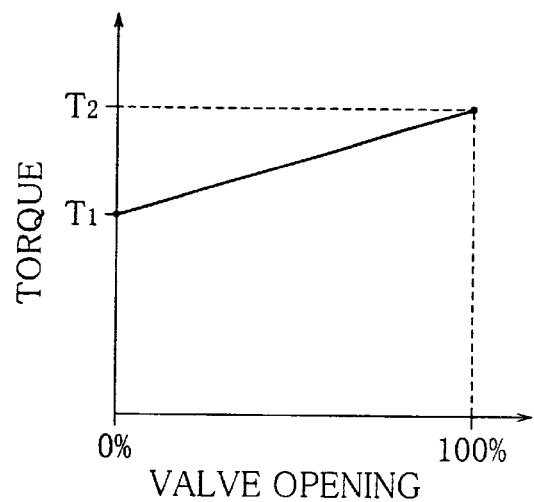
FIG. 9 is a chart exemplarily illustrating the relationship between the torque to be produced by a spiral type return spring of the spring unit and the valve opening.

In addition, a stopper (not shown) for determining the rotational limit position of the rotating shaft 32 in the closing direction is arranged on the inner surface of the housing body 31a. The valve element of the valve 2 closes completely when in this rotational limit position. As shown in FIG. 9, the spiral type return spring 33 is configured to produce a torque T1 in the closing direction that is sufficient to maintain the valve element to the closed position when the rotating shaft 32 is in contact with the stopper at the rotational limit position (valve opening 0%). The return spring 33 is also configured so that the produced torque increases as the valve shaft 22 is rotated in the opening direction by the actuator 4. In FIG. 9, T2 represents the torque produced at a valve opening of 100%.

As shown by broken lines in FIG. 1, the lid 31b of the housing 31 of the spring unit 3 is fixed to the housing body 31a with bolts 34. These bolts 34 are accessible only from below the housing body 31a. That is, the bolts 34 can be removed to detach the lid 31b from the housing body 31a only if the spring unit 3 is detached from the yoke 5. Such configuration prevents the lid 31b from being accidentally removed from the housing body 31a despite the intention of detaching the spring unit 3 from the yoke 5.

The housing 31 is attached to the yoke 5 with bolts 62 at its fitting parts 31c arranged on both sides. More specifically, the housing body 31a and the lid 31b have bolt through holes formed therethrough in these fitting parts 31c. The bolts 62 are inserted through the bolt through holes from above the lid 31b.

Next, description will be given of the actuator 4 which rotationally operates the valve shaft 22 of the valve 2 through the spring unit 3.

The electric actuator 4 used in the present embodiment is one according to the proposal of the present inventors, described in Japanese Patent Laid-Open Publication No. Hei 10-164878. Acceptable alternatives thereto include electric actuators of different types and fluid actuators.

As shown in FIGS. 1 and 5, the electric actuator 4 has a housing 41 which includes a body 41a and a lid 41b fixed to the body 41a with bolts 44. This housing 41 rotatably supports the actuator output shaft 42. The housing body 41a contains a motor, a reduction mechanism, an electromagnetic clutch, a rheostatic brake mechanism, a control circuit, and so on (none are shown). The motor and the electromagnetic clutch operate under the control of the control circuit.

In the electric actuator 4, the rotational power from the motor is transmitted through the reduction mechanism to the output shaft 42 so that the output shaft 42 rotates. The electromagnetic clutch is interposed between the motor and the reduction mechanism to allow/interrupt the transmission of the rotational power from the motor to the reduction mechanism. When the rotational power through the electromagnetic clutch is interrupted and the valve shaft 22 is rotated in the closing direction by the spring force of the return spring 33, the rheostatic brake mechanism limits the rotation speed of the valve shaft 22.

As shown in FIG. 1, the electric actuator 4 is fixed to the yoke 5 with bolts 63 at fitting parts 41c arranged on both side portions of its housing body 41a. The bolts are tightened from above. As shown in FIG. 5, the extremity of the output shaft 42 of the electric actuator 4 is protruded from the bottom of the housing body 41a. The extremity is chambered on the periphery so as to make the flat-faced part 42a which is square in section. The flat-faced part 42a fits into the square hole 32a in the rotating shaft 32 of the spring unit 3, whereby the actuator output shaft 42 is coupled to the rotating shaft 32 of the spring unit 3.

Figure 2:
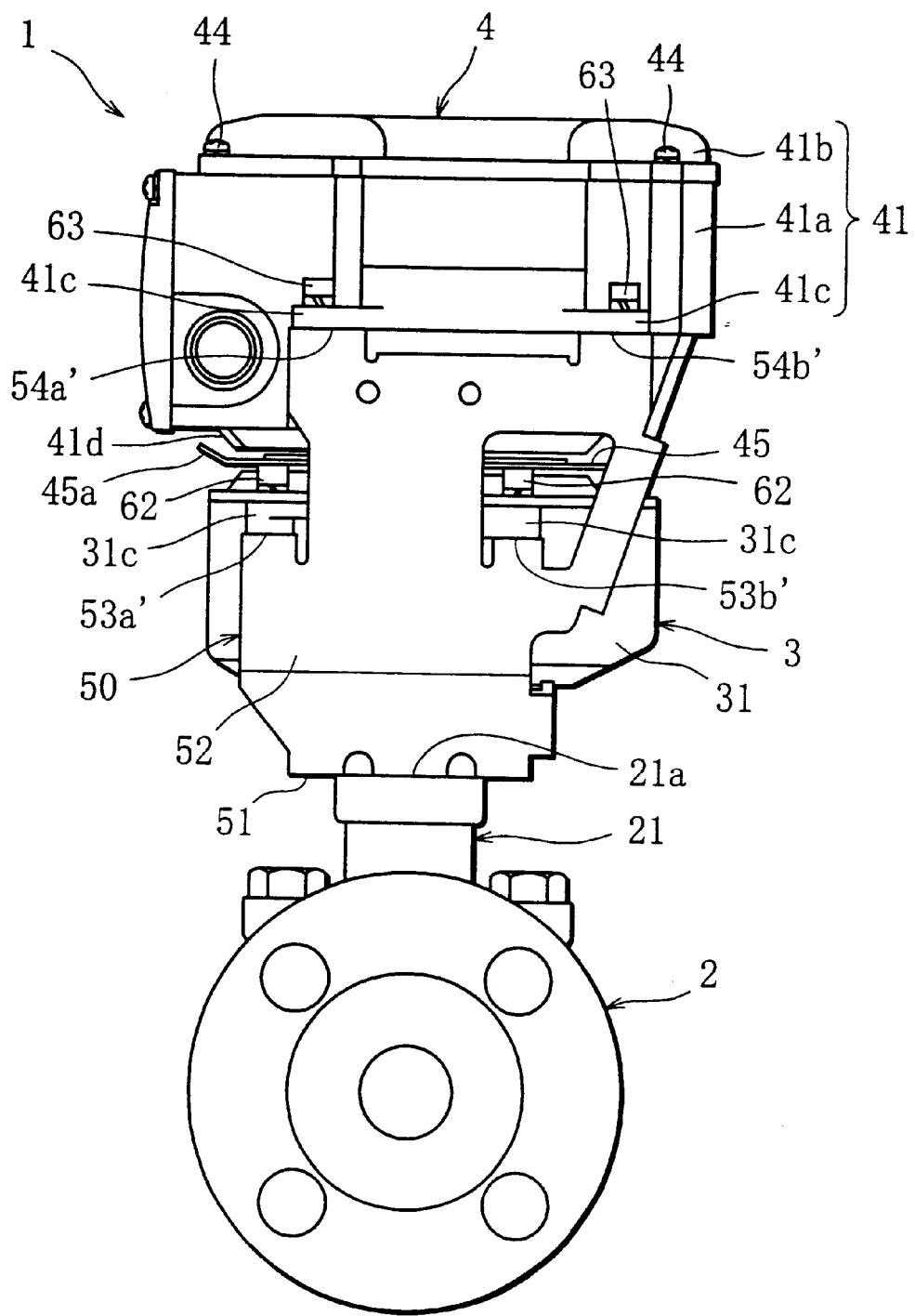
FIG. 2 is a side view of the spring return type valve system.

The spring return type valve system 1 has second valve opening indicating means. As shown in FIGS. 1 and 2, the second valve opening indicating means is composed of a pointer 45 and a mark 41d. The pointer 45 is arranged on the proximal end portion of the flat-faced part 42a of the actuator output shaft 42. The mark 41d is a projection or the like for indicating the closed position, arranged on a lower end portion of the periphery of the housing body 41a of the actuator 4. The pointer 45 indicates the current rotational position of the valve element which makes integral rotation with the actuator output shaft 42. The extremity 45a of the pointer 45 coincides with the mark 41d when the valve element is in the closed position. For the sake of facilitating the visual observation of the closed position, the mark 41d is preferably arranged as shown in FIG. 1, or at a central portion of an open periphery that extends between both side walls 52 and 52' of the yoke 5. Incidentally, the mark 41d may be arranged on every valve opening position desired. In the first valve opening indicating means described earlier, the marking 22b arranged on the valve shaft 22 may be replaced with a pointer similar to the pointer 45. In the second valve opening indicating means, the pointer 45 may be replaced with a marking similar to the marking 22b.

Now, description will be given of the yoke 5 with reference to FIGS. 6–8.

The yoke 5 has a bottom wall 51 and the right and left side walls 52 and 52' which are extended upward from both ends of the bottom wall 51 and are opposed to each other. The entire yoke 5 is formed in a general U shape as viewed from the front. The yoke 5 defines an accommodation space for accommodating the entire spring unit 3 and the lower half of the actuator 4. This accommodation space has an open top as well as open front and rear sides (in a broad sense, open faces). Incidentally, the U-shaped yoke 5 may be replaced with a yoke that has a peripheral wall provided with one or more openings corresponding to the open faces.

The bottom wall of the yoke 5 constitutes a first fitting part 51 for the valve 2 to be attached to. In addition, second fitting parts 53 for the spring unit 3 to be mounted on are arranged at intermediate portions of the side walls 52 and 52' of the yoke 5. Third fitting parts 54 for the actuator 4 to be mounted on are arranged on the extremities or distal end portions of the side walls 52 and 52'.

Figure 7:
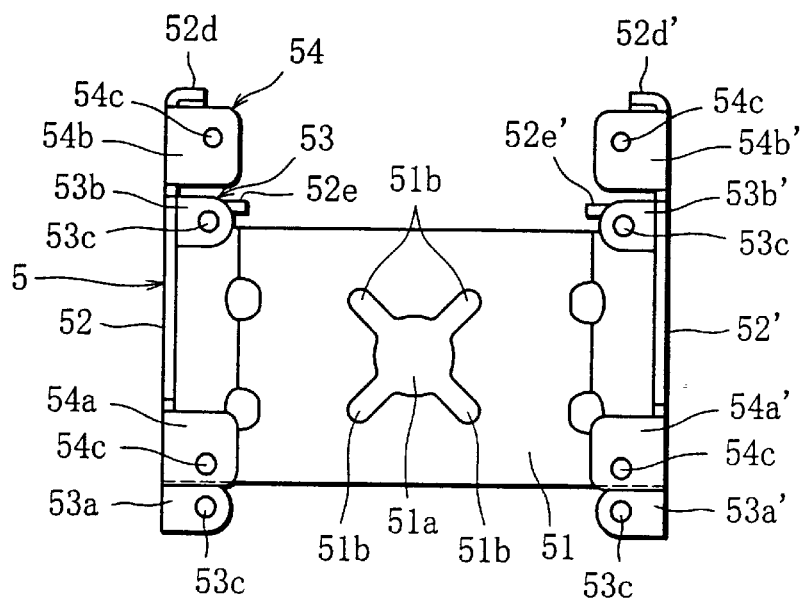
FIG. 7 is a plan view of the yoke.

As shown in FIG. 7, the bottom wall of the yoke 5 which makes the first fitting part 51 has a shaft hole 51a for the valve shaft 22 to be passed through loosely and four bolt through holes 51b. The bolt through holes 51b are arranged concentrically about the shaft hole 51a at regular intervals in angle, and are alignment with the four bolt holes formed in the top surface 21a of the housing 21 of the valve 2. These bolt through holes 51b are long holes extending from the shaft hole 51a in radial directions. The yoke 5 of such configuration can be mounted on a variety of valves 2 having bolt holes in different positions, and thus is excellent in versatility. Incidentally, it is not absolutely necessary that the bolt through holes 51b communicate with the shaft hole 51a at their proximal ends.

According to the above-described configuration, the valve 2 is provided with the four bolt holes at regular intervals in angle, and the yoke 5 is provided with the four bolt through holes 51b consistent with the bolt holes. Therefore, the yoke 5 can be mounted on the valve 2 as oriented to any one of four directions having 90° differences in circumferential angle about the valve shaft 22. This increases the flexibility in the orientation of the yoke 5 with respect to the fluid channel. In other words, the spring unit 3 and the actuator 4 have greater flexibility in the orientation with respect to the fluid channel.

The flat-faced part 22a of the valve shaft 22, the shaft hole 32a in the rotating shaft 32 of the spring unit 3, and the flat-faced part 42a of the actuator output shaft 42 each have a square section. Therefore, both the flat-faced parts 22a and 42a can be fitted to the shaft hole 32a as oriented to any one of four directions having 90° differences in circumferential angle about the axis. This increases the flexibility in establishing the coupling between the valve shaft 22 and the rotating shaft 32, and between the rotating shaft 32 and the actuator output shaft 42.

Figure 8:
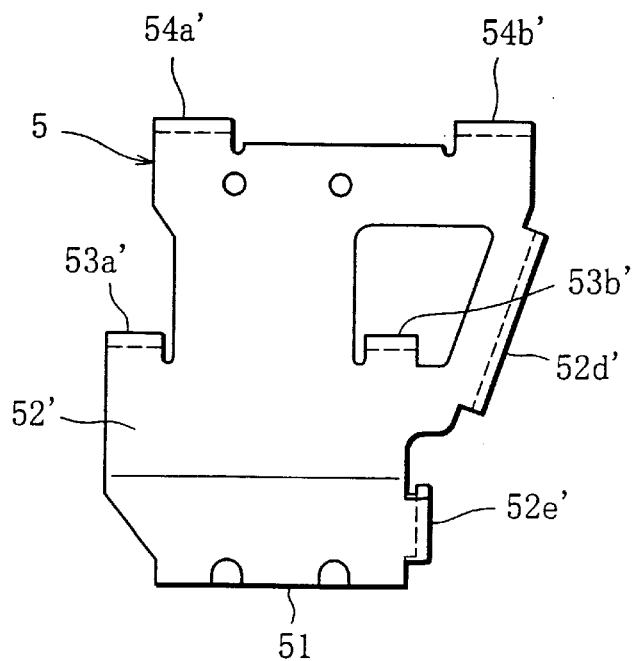
FIG. 8 is a side view of the yoke.

As shown in FIGS. 7 and 8, the two second fitting parts 53 of the yoke 5 consist of two pairs of support pieces 53a, 53b, 53a', and 53b', which are the corresponding portions of the side walls 52 and 52' of the yoke 5 cut and erected inward into an L shape, respectively. Each of the support pieces has a screw hole 53c. Then, as shown in FIGS. 1 and 2, the spring unit 3 is screwed to the second fitting parts 53 of the yoke 5 at its fitting parts 31c formed on both sides.

Similarly, the third fitting parts 54 of the yoke 5 consist of two pairs of support pieces 54a, 54b, 54a', and 54b' which are the corresponding portions of the side walls 52 and 52' of the yoke 5 cut and erected inward into an L shape, respectively. Each of the support pieces has a screw hole 54c. Then, the actuator 4 is screwed to the third fitting parts 54 of the yoke 5 at its fitting parts 41c formed on both sides.

Referring to FIGS. 2 and 3 again, the fitting parts 31c of the spring unit 3 and the fitting parts 41c of the actuator 4, as seen from above, are arranged apart from each other by no less than the sizes of the heads of the bolts 62 and 63. In regard to such physical relationship, the second fitting parts 53 and the third fitting parts 54 of the yoke 5 are arranged apart from each other as shown in FIG. 7. According to such configuration, the bolts 62 can be attached to and detached from the screw holes in the support pieces 53a, 53b, 53a', and 53b', which constitute the second fitting parts 53, from above without a screwdriver or other tools interfering with the support pieces 54a, 54b, 54a', and 54b' of the third fitting parts 54 which lie above the second fitting parts 53.

Of the support pieces constituting the second fitting parts 53, a pair of support pieces 53b and 53b' are arranged directly below the actuator 4 that is attached to the third fitting parts 54. According to this configuration, the fit between the flat-faced part 42a of the actuator output shaft 42 and the shaft hole 32a in the rotating shaft 32 of the spring unit 3 and the fit between the flat-faced part 22a of the valve shaft 22 and the shaft hole 32a in the rotating shaft 32 cannot be released before the actuator 4 is detached from the yoke 5. That is, the spring unit 3 can be detached from the yoke 5 only after the actuator 4 is detached from the yoke 5.

Figure 6:
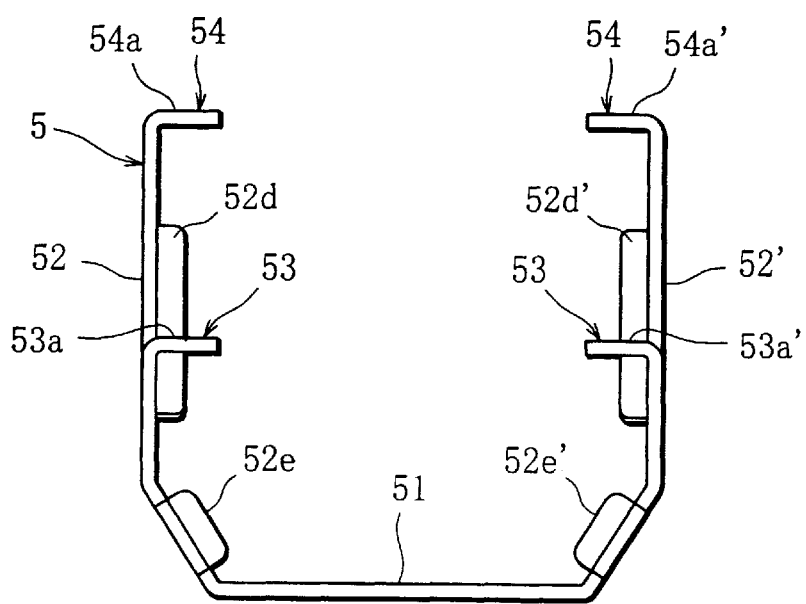
FIG. 6 is a front view of the yoke shown in FIG. 1.

In addition, as shown in FIGS. 6–8, some of the edge portions of the side walls 52 and 52' of the yoke 5 are bent inward at generally right angles. This forms reinforcing ribs 52d, 52e, 52d', and 52e' to increase the strength of the yoke 5. The yoke 5, being a shaped metal plate, has a radiating function and a heat absorbing function.

Hereinafter, description will be given of the procedure for assembling the spring return type valve system having the above-described configuration.

Initially, as shown in FIG. 1, the marking 22b on the valve shaft 22 of the valve 2 is set to the mark 21b on the housing 21 of the valve 2 which indicates the closed position, whereby the valve 2 is put in a closed state. Subsequently, the yoke 5 is placed on the top surface 21a of the housing 21 of the valve 2 so that the valve shaft 22 is passed with play through the shaft hole 51a (FIG. 7) which is formed in the first fitting part 51 of the yoke 5. The yoke 5 is fixed to the valve 2 with the bolts 61.

Then, the spring unit 3 is accommodated to between the side walls 52 and 52' of the yoke 5. The square hole 32a in the rotating shaft 32 of the spring unit 3 is fitted to the flat-faced part 22a of the valve shaft 22 to couple the rotating shaft 32 and the valve shaft 22 (FIG. 5).

In this coupling operation, the coupling portions of the valve shaft 22 and the rotating shaft 23 can be visually observed from exterior through the open periphery (opening) between the yoke side walls 52 and 52'. This allows an easy, quick coupling operation. In addition, since the flat-faced part 22a of the valve shaft 22 and the square hole 32a in the rotating shaft 32 each have a square section, the rotating shaft 32 can be coupled to the valve shaft 22 as oriented to any one of four directions having 90° differences in circumferential angles. Thus, the great flexibility in the orientation of the rotating shaft 32 upon coupling facilitates the assembly operation.

Then, the fitting parts 31c arranged on the housing 31 of the spring unit 3 are placed on the second fitting parts 53 of the yoke 5, respectively, and the spring unit 3 is fixed to the yoke 5 with the bolts 62.

Next, the extremity 45a of the pointer 45 attached to the actuator output shaft 42 is set to the mark 41d on the actuator 4 which indicates the closed position, before the actuator 4 is accommodated to between the yoke side walls 52 and 52'. Then, the flat-faced part 42a of the actuator output shaft 42 is fitted into the square hole 32a in the rotating shaft 32 of the spring unit 3, so that the actuator output shaft 42 is coupled to the rotating shaft 32 (FIG. 5). Since the coupling portions of the rotating shaft 32 and the actuator output shaft 42 are visible from exterior, the coupling operation can be performed easily and quickly. Besides, the flat-faced part 42a of the actuator output shaft 42 and the square hole 32a in the rotating shaft 32 have a square section. Therefore, the great flexibility in the orientation of the actuator output shaft 42 upon coupling facilitates the assembly operation.

Figure 3:
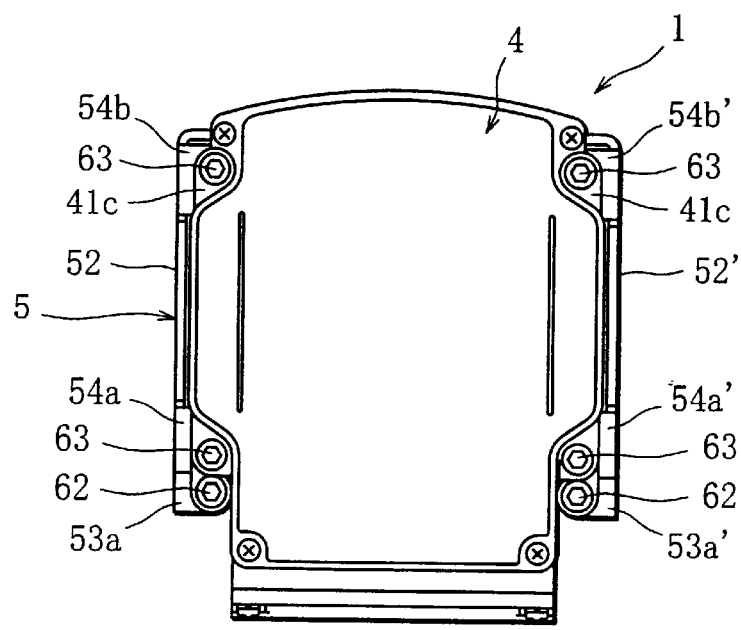
FIG. 3 is a plan view of the spring return type valve system.
Figure 4:
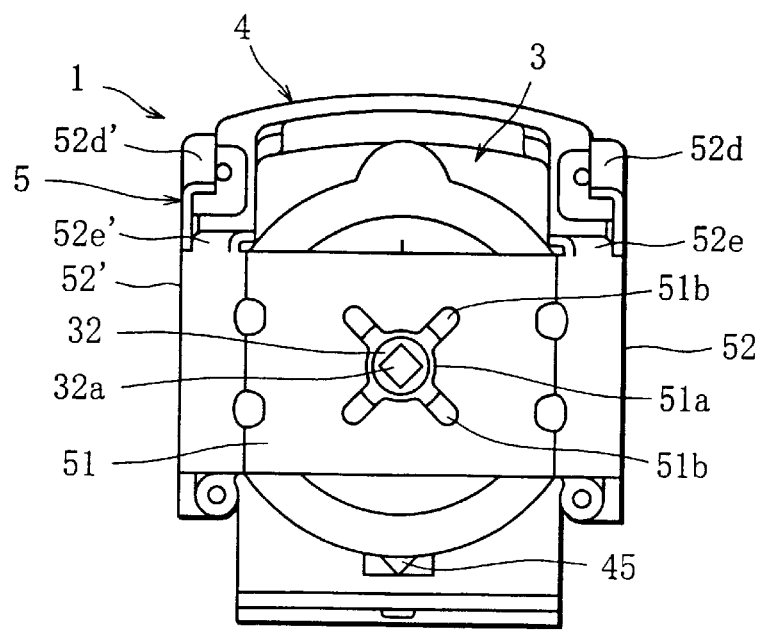
FIG. 4 is a bottom view of the spring return type valve system taken along the line IV—IV of FIG. 1.

Then, the fitting parts 41c on both sides of the actuator 4 are placed on the third fitting parts 54 of the yoke 5, and the actuator 4 is fixed to the yoke 5 with the bolts 63 (FIG. 3). All the bolts 61–63 can be set from above with excellent workability.

The spring unit 3 and the actuator 4 are thus mounted on the valve 2 via the yoke 5 in succession, completing the assembly of the spring return type valve system 1.

In the spring return type valve system 1, the spring unit 3 and the actuator 4 can only be attached to the yoke 5 in this order. Besides, the detachment from the yoke 5 is possible only in the order of the actuator 4 and the spring unit 3.

More specifically, as shown in FIGS. 1 and 2, the four bolts 61 for fixing the first fitting part 51 of the yoke 5 to the valve 2 lies directly below the spring unit 3. When the spring unit 3 is attached to the second fitting parts 53 of the yoke 5, tools are hardly usable because of interference with the surroundings, failing or finding it extremely hard to remove the bolts 61. Furthermore, among the four bolts 62 for fixing the spring unit 3 to the second fitting parts 53 of the yoke 5, the two screwed to the support pieces 53b and 53b' lie directly below the actuator 4. When the actuator 4 is attached to the third fitting parts 54, tools are hardly usable and these two bolts cannot be removed.

In this way, the spring return type valve system 1 is configured so that the spring unit 3 and the actuator 4 can be attached to and detached from the yoke 5 in proper order alone.

Hereinafter, description will be given of the operation of the spring return type valve system 1.

When the external power supply to the electric actuator 4 is interrupted, the valve 2 is closed by the spring force from the return spring 33 of the spring unit 3 (corresponding to the torque T1 shown in FIG. 9), stopping the flow of the fluid in the fluid channel. When the actuator 4 is supplied with power, the motor output shaft and the reduction mechanism are coupled to each other drivingly through the electromagnetic clutch, and the control circuit enters an operating state. The control circuit makes the motor rotate in the opening direction or the closing direction so that the current valve opening coincides with a target valve opening which is set from exterior. The rotational power from the motor is transmitted through the electromagnetic clutch and the reduction mechanism to the output shaft 42 of the actuator 4 so that the output shaft 42 rotates. Thereby, the valve shaft 22 is rotated to the target valve opening against the spring force from the return spring 33 of the spring unit 3. When the valve shaft 22 reaches the target valve opening, the energization of the motor is suspended. The holding power of the motor maintains the valve shaft 22 to this valve opening against the spring force of the return spring 33, so that the fluid flows through the fluid channel at a flow rate corresponding to the valve opening. Adjustably setting the target valve opening allows variable control of the flow of the fluid.

In cases where the power supply to the actuator 4 is shut off due to a power failure or the like, the energization to the electromagnetic clutch is interrupted to release the coupling between the motor output shaft and the reduction mechanism via the electromagnetic clutch. As a result, the holding power of the motor disappears and the valve 2 is closed by the spring force of the return spring 33.

Now, when hot fluid such as steam flows through the fluid channel, the valve 2 becomes high in temperature and the heat conducts from the valve 2 toward the spring unit 3 and the actuator 4. Here, the heat from the valve 2 is radiated through the yoke 5. This suppresses heat conduction to the spring unit 3 and the actuator 4, reducing the thermal degradation of the spring unit 3 and the actuator 4 for improved durability.

On the other hand, when cold fluid flows through the fluid channel, the entire valve 2 becomes low in temperature. The yoke 5 absorbs heat from the ambient air to relieve the temperature drop of the spring unit 3 and the actuator 4. This prevents or reduces condensation inside the spring unit 3 and the actuator 4, thereby avoiding rust production on metal parts and a condensation-based short of electric circuits.

Now, in cases where the electric actuator 4 suffers a breakdown that the actuator output shaft 42 becomes unrotatable due to such reasons as a gear breakage in the reduction mechanism, there can occur problems such that the entire actuator 4 rotates under the spring force of the return spring 33 as stated previously if the operator accidentally detaches the actuator 4 from the yoke 5. In this regard, the spring return type valve system 1 comprises the first valve opening indicating means, composed of the marking 22b arranged on the valve shaft and the mark 21b arranged on the valve housing 21, and the second valve opening indicating means, composed of the pointer 45 arranged on the actuator output shaft 42 and the mark 41d arranged on the actuator housing body 41a. Thus, the operator can visibly observe the opening of the valve 2 from exterior, based on the position of the marking 22b with respect to the mark 21b and the position of the pointer 45 with respect to the mark 41d.

If the valve 2 is visually observed and found closed, the operator determines that the actuator 4 can be detached from the yoke 5 without problems. If the valve 2 is visually observed and found open, the operator determines that the detachment of the actuator 4 from the yoke 5 may cause a trouble. Then, the actuator asks an expert for detachment, repair, or replacement of the actuator 4 if necessary. Since the actuator 4 is thus detached from the yoke 5 after the visual observation of the opening of the valve 2, there no longer occur the problems associated with the actuator detachment. At the occasion of detaching the actuator 4, the bolts 63 are removed from the fitting parts 41c of the actuator housing 41 and then the actuator 4 is pulled up. Thereby, the coupling between the actuator output shaft 42 and the rotating shaft 32 of the spring unit 3 is easily released to detach the actuator 4 from the yoke 5.

In detaching the spring unit 3, the bolts 62 are removed from the fitting parts 31c of the housing 31 of the spring unit 3 after the detachment of the actuator 4 from the yoke 5. Then, the spring unit 3 is pulled up. Thereby, the coupling between the rotating shaft 32 of the spring unit 3 and the valve shaft 22 is released to detach the spring unit 3 from the yoke 5. Even where the fluid flowing through the fluid channel is hot, the temperatures of the housing 41 of the actuator 4, the bolts 62, and the like are lowered by the radiating function of the yoke 5 for better workability. As stated previously, the spring unit 3 is configured so that the lid 31b can be removed from the housing body 31a only if the spring unit 3 is detached from the yoke 5. This eliminates the possibility that the lid 31b is accidentally removed from the housing body 31a before the detachment of the spring unit 3 from the yoke 5, thereby avoiding the problems associated with the accidental removal of the lid 31b.

Moreover, in detaching the yoke 5 from the valve 2, the actuator 4 and the spring unit 3 are detached from the yoke 5 before the bolts 61 are removed from the bolt holes in the housing top surface 21a of the valve 2 and the yoke 5 is lift off the valve 2.

As described above, the assembling and disassembling operations of the spring return type valve system 1 can only be performed under the predetermined procedure. Thus, it is possible to avoid accidents due to such reasons as operator negligence.

Various modifications may be made to the spring return type valve system according to the first embodiment described above.

For example, the forgoing first embodiment has dealt with the valve system in which the valve closes completely when the power supply to the actuator 4 is shut off. However, the valve 2 may take any opening on the interruption of the power supply. For example, the valve 2 may be configured to be fully open or partly open on the interruption of the power supply.

In addition, the foregoing first embodiment has used a flow control valve which can adjustably control the valve opening from full close through full open, whereas an on-off valve may be used instead.

Furthermore, the foregoing first embodiment has dealt with the spring return type valve system which comprises the spring return type operating device composed of the spring unit 3, the actuator 4, and the yoke 5, and the flow control valve 2 as the object to be operated. However, the object to be operated is not limited to the flow control valve. In other words, the spring return type operating device described in the foregoing first embodiment may be used to operate such objects as dumpers, doors, folding doors of buses and phone booths, and robot arms.

Figure 10:
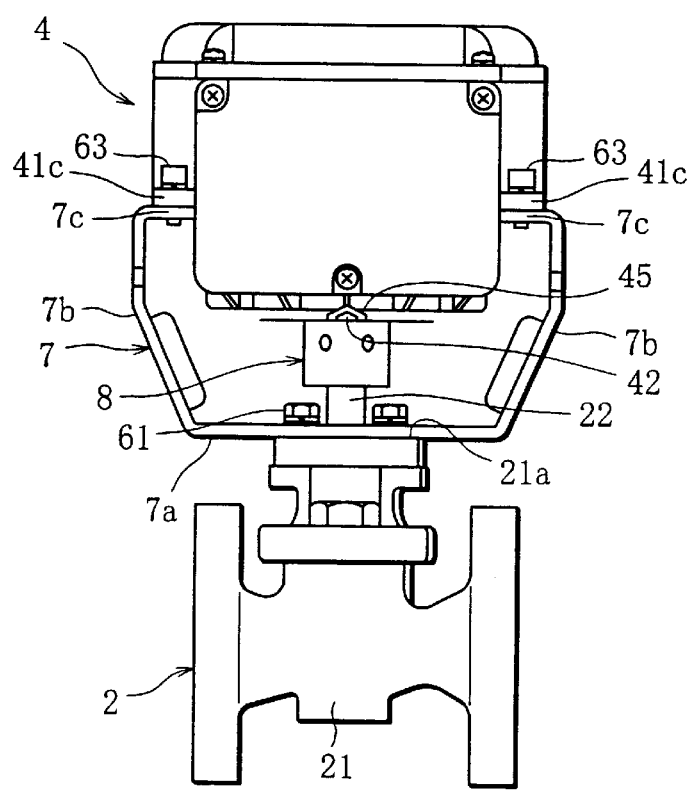
FIG. 10 is a front view of a valve system according to a second embodiment of the present invention.

Now, referring to FIG. 10, description will be given of a non-spring return type valve system according to a second embodiment of the present invention.

The valve system of the present embodiment corresponds to the spring return type valve system of the first embodiment without the spring unit 3. That is, the valve system is one in which the electric actuator 4 is attached to the valve 2 through the medium of a yoke 7. The valve shaft 22 and the actuator output shaft 42 are coupled to each other via a joint 8.

The yoke 7 corresponds to the yoke 5 shown in FIG. 1 without the fitting parts 31c for mounting a spring unit. In other respects, the yoke 7 is configured as the yoke 5 is. More specifically, the yoke 7 includes a bottom wall 7a as well as right and left side walls 7b which are extended upward from both sides thereof. The central portion of the bottom wall 7a constitutes an fitting part for attaching the yoke 7 to the top surface 21a of the housing 21 of the valve 2. That is, a shaft hole (not shown) for the valve shaft 22 to be passed through loosely is formed in the central portion of the bottom wall 7a. In addition, a plurality of bolt through holes (not shown) are formed concentrically about the shaft hole at regular intervals in angle. The yoke 7 is placed on the housing top surface 21a of the valve with the valve shaft 22 passed through its shaft hole, and is fixed to the housing top surface 21a with the bolts 61.

A pair of support pieces 7c are arranged as fitting parts on the top end portions of the side walls 7b of the yoke 7. Then, the actuator 4 is accommodated to between the side walls 7a. The fitting parts 41c of the actuator 4 are fixed to the support pieces 7c of the yoke 7 with the bolts 63.

The joint 8 has a square hole (not shown) formed along its axis. The top end, or flat-faced part (not shown), of the valve shaft 22 is fitted into this square hole from below. The bottom end portion, or flat-faced part, of the actuator output shaft 42 is fitted into the square hole from above. That is, the valve shaft 22 and the actuator output shaft 42 are coupled to each other by the joint 8. Incidentally, the actuator 4 can be used for both the spring return type valve system of the first embodiment and the non-spring return type valve system valve system of the present embodiment.

The operation of this non-spring return type valve system is identical to that of the spring return type valve system of the first embodiment except the absence of the spring return function from the spring unit. Therefore, description will be omitted of the operation.

As is the case with the first embodiment, various modifications may be made to the non-spring return type valve system of the second embodiment described above.

For example, the foregoing second embodiment has dealt with the non-spring return type valve system which includes the operating device composed of the actuator 4 and the yoke 7, and the flow control valve 2 as the object to be operated. However, the object to be operated is not limited to the flow control valve. That is, the non-spring return type operating device described in the foregoing second embodiment can be used to operate such objects as dumpers. The flow control valve may be replaced with an on-off valve.

Furthermore, in the present invention, the use of the electric actuator is not essential. A fluid actuator or the like may be used instead. Various other modifications may be made to the present invention within the concept of the invention.

What is claimed is:

1. A spring return type operating device comprising:
    a yoke adapted to be mounted on an object to be operated having a rotating shaft;
    an actuator having a drive unit and an output shaft rotated by the drive unit, said actuator being detachably mounted on said yoke; and
    a spring unit detachably mounted on said yoke so as to lie between said actuator and said object to be operated, said spring unit having a rotating shaft and a return spring for producing a spring force for rotating the rotating shaft in one direction, said rotating shaft having a first end portion thereof adapted to be coupled to the rotating shaft of the object to be operated and a second end portion thereof coupled to the output shaft of said actuator, said yoke defining a space for accommodating at least part of said actuator and at least part of said spring unit, said space having an open face for making coupling portions of the first and second end portions of the rotating shaft of said spring unit with the rotating shaft of the object to be operated and the output shaft of said actuator, respectively, visible from exterior.

2. The spring return type operating device according to claim 1, wherein said drive unit of said actuator is composed of an electric motor.

3. The spring return type operating device according to claim 1, wherein said yoke has a bottom wall and side walls that are extended from both ends of the bottom wall and are opposed to each other, and
    the bottom wall of said yoke is provided with a first fitting part to which the object to be operated is attached, second fitting parts for said spring unit to be mounted on are arranged at intermediate portions of the side walls, and third fitting parts for said actuator to be mounted on are arranged on distal end portions of the side walls.

4. The spring return type operating device according to claim 3, wherein the second fitting parts are arranged in such positions that said spring unit mounted on the second fitting parts and the first fitting part come close to each other at their opposed surfaces, and the third fitting parts are arranged in such positions that said actuator mounted on the third fitting parts and said spring unit mounted on the second fitting parts come close to each other at their opposed surfaces.

5. The spring return type operating device according to claim 3, wherein the first fitting part of said yoke has a shaft hole which is formed through the bottom wall of said yoke and which permits the rotating shaft of the object to be operated to pass therethrough, and has a plurality of bolt through holes which are formed in the bottom wall concentrically about the shaft hole at regular intervals in angle, and the object to be operated is provided with a plurality of bolt holes consistent with the plurality of bolt through holes.

6. The spring return type operating device according to claim 5, wherein the plurality of bolt through holes are long holes extending in radial directions of the shaft hole.

7. The spring return type operating device according to claim 5, wherein the second and third fitting parts are formed by cutting and erecting inward corresponding portions of the side walls of said yoke.

8. The spring return type operating device according to claim 3, wherein the second and third fitting parts are arranged apart from each other as seen from above.

9. The spring return type operating device according to claim 1, wherein the rotating shaft of the object to be operated or the output shaft of said actuator is provided with indicating means for allowing a visual observation of a predetermined rotational position of the rotating shaft or the output shaft.

10. A spring return type valve system comprising:

a valve having a valve shaft arranged rotatably and a valve element integral with the valve shaft;

a yoke mounted on said valve;

an actuator having a drive unit and an output shaft rotated by the drive unit, said actuator being detachably mounted on said yoke; and a spring unit having a rotating shaft and a spring for producing a spring force for rotating the rotating shaft in one direction, said spring unit bring detachably mounted on said yoke so as to lie between said actuator and said valve, said rotating shaft being coupled at both end portions to the output shaft and the valve shaft, respectively, wherein said yoke defines a space for accommodating at least part of said actuator and at least part of said spring unit, said space having an open face for making coupling portions of the both end portions of the rotating shaft of said spring unit with the valve shaft and the output shaft of said actuator, respectively, visible from exterior.

* * * * *